United States Patent
Kim et al.

(10) Patent No.: US 9,748,800 B2
(45) Date of Patent: Aug. 29, 2017

(54) WIRELESS POWER TRANSMISSION SYSTEM, AND METHOD OF CONTROLLING POWER IN WIRELESS POWER TRANSMISSION SYSTEM BASED ON DETECTION PARAMETER

(71) Applicant: SAMSUNG ELECTRONICS CO., LTD, Suwon-si (KR)

(72) Inventors: Nam Yun Kim, Seoul (KR); Sang Wook Kwon, Seongnam-si (KR); Yun Kwon Park, Dongducheon-si (KR); Eun Seok Park, Suwon-si (KR); Ki Young Kim, Yongin-si (KR); Young Ho Ryu, Yongin-si (KR); Dong Zo Kim, Yongin-si (KR); Jin Sung Choi, Gimpo-si (KR); Chang Wook Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1028 days.

(21) Appl. No.: 13/675,055

(22) Filed: Nov. 13, 2012

(65) Prior Publication Data

US 2013/0127256 A1    May 23, 2013

(30) Foreign Application Priority Data

Nov. 18, 2011 (KR) .................. 10-2011-0121021

(51) Int. Cl.
*H02J 17/00* (2006.01)
*H02J 5/00* (2016.01)
*H02J 7/02* (2016.01)

(52) U.S. Cl.
CPC .............. *H02J 17/00* (2013.01); *H02J 5/005* (2013.01); *H02J 7/025* (2013.01)

(58) Field of Classification Search
CPC ...................................................... H02J 17/00
(Continued)

(56) References Cited

U.S. PATENT DOCUMENTS

| 8,179,089 B2* | 5/2012 | Shiozaki | H02J 7/025 320/106 |
| 8,190,189 B2* | 5/2012 | Lerke | H04R 25/552 381/23.1 |

(Continued)

FOREIGN PATENT DOCUMENTS

| EP | 2 211 579 A1 | 7/2010 |
| JP | 2006-060909 A | 3/2006 |

(Continued)

OTHER PUBLICATIONS

Korean Office Action dated Jun. 20, 2017 in Counterpart Korean Application No. 10-2011-0121021 (17 pages with English translation).

Primary Examiner — Rexford Barnie
Assistant Examiner — Elim Ortiz
(74) Attorney, Agent, or Firm — NSIP Law

(57) ABSTRACT

A wireless power transmission system, and a method of controlling power in the wireless power transmission system based on a detection parameter are provided. The method includes transmitting a request signal to a device. The method further includes receiving, from the device, a response signal corresponding to the request signal, the response signal including a parameter of the device. The method further includes generating an operation power based on the parameter of the device, the operation power being used for an operation of the device.

20 Claims, 18 Drawing Sheets

(58) Field of Classification Search
USPC .......................................................... 307/104
See application file for complete search history.

(56) References Cited

U.S. PATENT DOCUMENTS

| | | | |
|---|---|---|---|
| 2007/0145830 A1* | 6/2007 | Lee ........................ | H02J 5/005 307/135 |
| 2009/0243397 A1* | 10/2009 | Cook ...................... | H02J 5/005 307/104 |
| 2010/0118692 A1* | 5/2010 | Wakutsu ........... | H04W 52/0235 370/210 |
| 2010/0184383 A1 | 7/2010 | Lerke | |
| 2012/0235636 A1* | 9/2012 | Partovi .................. | H02J 7/025 320/108 |

FOREIGN PATENT DOCUMENTS

| | | |
|---|---|---|
| JP | 2009-303294 A | 12/2009 |
| JP | 2010-028934 A | 2/2010 |
| JP | 2011-24332 | 2/2011 |
| KR | 10-2011-0110987 A | 10/2011 |

\* cited by examiner

FIG. 8

| Code | Command |
|---|---|
| 0001 | Reset |
| 0010 | Rectifier input voltage/current request<br>Rectifier input voltage/current response |
| 0011 | DC/DC output voltage/current request<br>DC/DC output voltage/current response |
| 0100 | ACK |
| 0101 | Power-on request |
| 0110 | Power-off request |
| 0111 | Target state information request<br>Target state information response |
| 1000 | Access standard |
| 1001 | NACK |
| 1010 | Reserved for future use |
| 1110 | Target device registration information request<br>Target device registration information response |
| 1111 | Reserved for future use |
|  | Target resonator on/off request |

WIRELESS POWER TRANSMISSION SYSTEM, AND METHOD OF CONTROLLING POWER IN WIRELESS POWER TRANSMISSION SYSTEM BASED ON DETECTION PARAMETER

CROSS-REFERENCE TO RELATED APPLICATION(S)

This application claims the benefit under 35 U.S.C. §119 (a) of Korean Patent Application No. 10-2011-0121021, filed on Nov. 18, 2011, in the Korean Intellectual Property Office, the entire disclosure of which is incorporated herein by reference for all purposes.

BACKGROUND

1. Field

The following description relates to a wireless power transmission system, and a method of controlling power in the wireless power transmission system based on a detection parameter.

2. Description of Related Art

Research on wireless power transmission has been conducted to overcome an increase in inconveniences of wired power supplies, and the limited capacity of conventional batteries, due to an explosive increase in various electronic devices including, for example, mobile devices. One of wireless power transmission technologies uses resonance characteristics of radio frequency (RF) elements.

Wireless power refers to energy that is transferred from a wireless power transmitter to a wireless power receiver, for example, through magnetic coupling. A wireless power transmission system includes a source device and a target device. The source device wirelessly transmits power, and the target device wirelessly receives power. The source device may be referred to as a wireless power transmitter, and the target device may be referred to as a wireless power receiver.

The source device includes a source resonator, and the target device includes a target resonator. Magnetic coupling or resonance coupling may be formed between the source resonator and the target resonator. Additionally, the source device and the target device communicate with each other to transmit and receive control information and state information.

SUMMARY

In one general aspect, there is provided a method of controlling power in a wireless power transmission system, the method including transmitting a request signal to a device. The method further includes receiving, from the device, a response signal corresponding to the request signal, the response signal including a parameter of the device. The method further includes generating an operation power based on the parameter of the device, the operation power being used for an operation of the device.

In another general aspect, there is provided a method of receiving power in a wireless power transmission system, the method including receiving a request signal from a device. The method further includes transmitting, to the device, a response signal corresponding to the request signal, the response signal including a parameter of another device. The method further includes receiving an operation power from the device, the operation power being generated based on the parameter of the other device.

In still another general aspect, there is provided a device of a wireless power transmission system, the device including a power converter configured to generate an operation power, the operation power being used for an operation of another device. The device further includes a control/communication unit configured to transmit a request signal to the other device, receive, from the other device, a response signal corresponding to the request signal, the response signal including a parameter of the other device, and control the power converter to generate the operation power based on the parameter of the other device.

In yet another general aspect, there is provided a device of a wireless power transmission system, the device including a control/communication unit configured to receive a request signal from another device, and transmit, to the other device, a response signal corresponding to the request signal, the response signal including a parameter of the device. The device further includes a resonator configured to receive an operation power from the other device, the operation power being generated based on the parameter of the device.

Other features and aspects will be apparent from the following detailed description, the drawings, and the claims.

BRIEF DESCRIPTION OF THE DRAWINGS

FIG. 8 is a diagram illustrating examples of commands used to perform communication between a source device and a target device.

Figure 1:
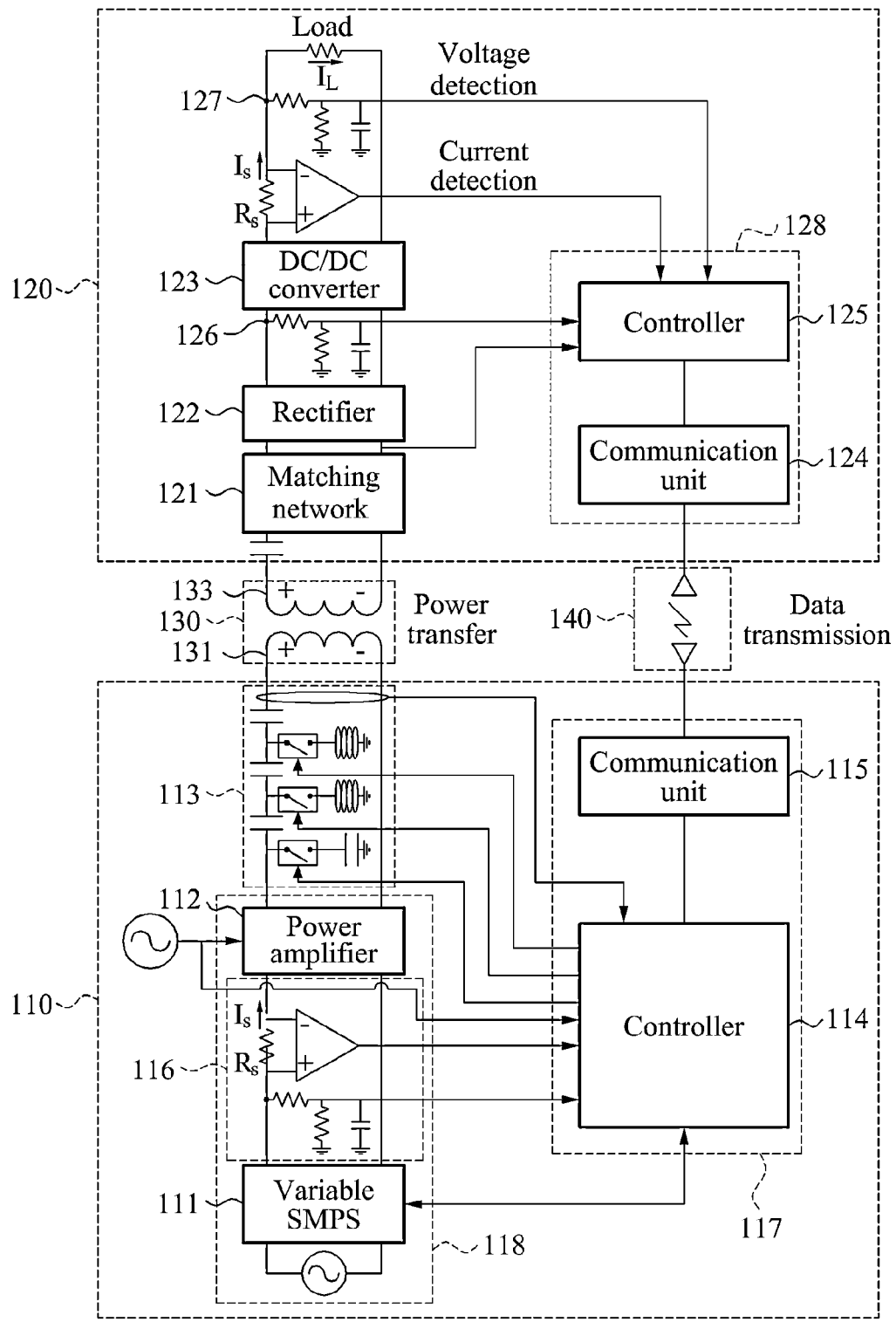
FIG. 1 is a diagram illustrating an example of a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 is a diagram illustrating an example of a wireless power transmission system. Referring to FIG. 1, the wireless power transmission system includes a source device 110 and a target device 120. The source device 110 is a device supplying wireless power, and may be any of various devices that supply power, such as pads, terminals, televisions (TVs), and any other device that supplies power. The target device 120 is a device receiving wireless power, and may be any of various devices that consume power, such as terminals, TVs, vehicles, washing machines, radios, lighting systems, and any other device that consumes power.

The source device 110 includes a variable switching mode power supply (SMPS) 111, a power amplifier 112, a matching network 113, a controller 114, a communication unit 115, a power detector 116, and a source resonator 131. The target device 120 includes a matching network 121, a rectifier 122, a direct current-to-direct current (DC/DC) converter 123, a communication unit 124, a controller 125, a power detector 127, and a target resonator 133.

The controller 114 and the communication unit 115 may be included in a control/communication unit 117. The variable SMPS 111 and the power amplifier 112 may be included in a power converter 118. The communication unit 124 and the controller 125 may be included in a control/communication unit 128.

The variable SMPS 111 generates a DC voltage by switching an alternating current (AC) voltage having a frequency of tens of hertz (Hz) output from a power supply. The variable SMPS 111 may output a DC voltage having a predetermined level, or may output a DC voltage having an adjustable level by the controller 114.

The variable SMPS 111 may control the DC voltage based on a level of power output from the power amplifier 112 so that the power amplifier 112 may operate in a saturation region with high efficiency at all times, and may enable a maximum efficiency to be maintained at all levels of the output power. The power amplifier 112 may include class-E features.

For example, when a common SMPS is used instead of the variable SMPS 111, a variable DC/DC converter may need to be additionally used. In this example, the common SMPS and the variable DC/DC converter may control the DC voltage based on the level of the power output from the power amplifier 112 so that the power amplifier 112 may operate in the saturation region with high efficiency at all times, and may enable the maximum efficiency to be maintained at all levels of the output power.

The power detector 116 detects an output current and an output voltage of the variable SMPS 111, and provides, to the controller 114, information on the detected current and the detected voltage. Additionally, the power detector 116 detects an input current and an input voltage of the power amplifier 112.

The power amplifier 112 generates a power by converting the DC voltage output from the variable SMPS 111 to an AC voltage using a switching pulse signal having a frequency of a few kilohertz (kHz) to tens of megahertz (MHz). In other words, the power amplifier 112 converts a DC voltage supplied to a power amplifier to an AC voltage using a reference resonance frequency $F_{Ref}$, and generates a communication power to be used for communication, or a charging power to be used for charging that may be used in a plurality of target devices. The communication power may be, for example, a low power of 0.1 to 1 milliwatts (mW) that may be used by a target device to perform communication, and the charging power may be, for example, a high power of 1 mW to 200 Watts (W) that may be consumed by a device load of a target device. In this description, the term "charging" may refer to supplying power to an element or a unit that charges a battery or other rechargeable device with power. Also, the term "charging" may refer supplying power to an element or a unit that consumes power. For example, the term "charging power" may refer to power consumed by a target device while operating, or power used to charge a battery of the target device. The unit or the element may include, for example, a battery, a display device, a sound output circuit, a main processor, and various types of sensors.

The communication power may be referred to as a wake-up power used to activate a communication function and a control function of the target device 120. Additionally, the charging power may be referred to as an operation power used for an operation of the target device 120.

The power converter 118 may convert the DC voltage to the AC voltage using a resonant frequency to generate the wake-up power or the operation power.

In this description, the term "reference resonance frequency" refers to a resonance frequency that is nominally used by the source device 110, and the term "tracking frequency" refers to a resonance frequency used by the source device 110 that has been adjusted based on a predetermined scheme.

The control/communication unit 117 transmits, to the target device 120, a wake-up request signal for initial communication, and receives, from the target device 120, a response signal corresponding to the wake-up request signal. The response signal includes a detection parameter of the target device 120. Additionally, the control/communication unit 117 controls the power converter 118 based on the detection parameter of the target device 120.

The control/communication unit 117 acquires a detection parameter of the source device 110 that is associated with an amount of the wake-up power, and determines a power transmission efficiency of the source device 110 based on the detection parameter of the source device 110 and the detection parameter of the target device 120. The control/communication unit 117 further determines an amount of the operation power based on the power transmission efficiency.

The controller 114 may detect a reflected wave of the communication power or a reflected wave of the charging power, and may detect mismatching between the target resonator 133 and the source resonator 131 based on the detected reflected wave. The controller 114 may detect the mismatching by detecting an envelope of the reflected wave, or by detecting an amount of a power of the reflected wave.

Additionally, the controller 114 compares a phase of an input waveform input into the power amplifier 112, with a phase of an input waveform input into the source resonator 131, to detect the mismatching. A value of the phase of the input waveform input into the power amplifier 112 may remain unchanged; however, a value of the phase of the input waveform input into the source resonator 131 may be changed due to a change in a load. For example, when a difference between the phase of the input waveform input into the power amplifier 112 and the phase of the input waveform input into the source resonator 131 is greater than a predetermined value, the controller 114 determines that the load is changed.

In another example, the controller 114 may periodically detect the phase of the input waveform input into the power amplifier 112, and the phase of the input waveform input into the source resonator 131. When the difference between the phases is greater than the predetermined value, the controller 114 requests the target device 120 to transmit the detection parameter of the target device 120. In this example, the controller 114 re-determines the power transmission efficiency based on the detection parameter received from the target device 120, and changes the output power of the power amplifier 112 based on the re-calculated power transmission efficiency.

Under the control of the controller 114, the matching network 113 compensates for impedance mismatching between the source resonator 131 and the target resonator 133 so that the source resonator 131 and the target resonator 133 are optimally-matched. The matching network 113 includes combinations of a capacitor and an inductor that are connected to the controller 114 through a switch, which is under the control of the controller 114.

The controller 114 may calculate a voltage standing wave ratio (VSWR) based on a voltage level of the reflected wave and a level of an output voltage of the source resonator 131 or the power amplifier 112. When the VSWR is greater than a predetermined value, the controller 114 detects the mismatching. In this example, the controller 114 calculates a power transmission efficiency of each of N predetermined tracking frequencies, determines a tracking frequency $F_{Best}$ having the best power transmission efficiency among the N predetermined tracking frequencies, and changes the reference resonance frequency $F_{Ref}$ to the tracking frequency $F_{Best}$.

Also, the controller 114 may control a frequency of the switching pulse signal used by the power amplifier 112. By controlling the switching pulse signal used by the power amplifier 112, the controller 114 may generate a modulation signal to be transmitted to the target device 120. In other words, the communication unit 115 may transmit various messages to the target device 120 via in-band communication. Additionally, the controller 114 may detect a reflected wave, and may demodulate a signal received from the target device 120 through an envelope of the reflected wave.

The controller 114 may generate a modulation signal for in-band communication using various schemes. To generate a modulation signal, the controller 114 may turn on or off the switching pulse signal used by the power amplifier 112, or may perform delta-sigma modulation. Additionally, the controller 114 may generate a pulse-width modulation (PWM) signal having a predetermined envelope.

The communication unit 115 may perform out-of-band communication using a communication channel. The communication unit 115 may include a communication module, such as a ZigBee module, a Bluetooth module, or any other communication module, that the communication unit 115 may use to perform the out-of-band communication. The communication unit 115 may transmit or receive data 140 to or from the target device 120 via the out-of-band communication.

The source resonator 131 transfers electromagnetic energy 130, such as the communication power or the charging power, to the target resonator 133 via a magnetic coupling with the target resonator 133.

The target resonator 133 receives the electromagnetic energy 130, such as the communication power or the charging power, from the source resonator 131 via a magnetic coupling with the source resonator 131. Additionally, the target resonator 133 receives various messages from the source device 110 via the in-band communication.

The matching network 121 matches an input impedance viewed from the source device 110 to an output impedance viewed from a load. The matching network 121 may be configured with a combination of a capacitor and an inductor.

The rectifier 122 generates a DC voltage by rectifying an AC voltage received by the target resonator 133.

The DC/DC converter 123 adjusts a level of the DC voltage output from the rectifier 122 based on a voltage rating of the load. For example, the DC/DC converter 123 may adjust the level of the DC voltage output from the rectifier 122 to a level in a range from 3 volts (V) to 10 V.

The power detector 127 detects a voltage of an input terminal 126 of the DC/DC converter 123, and a current and a voltage of an output terminal of the DC/DC converter 123. The power detector 127 outputs the detected voltage of the input terminal 126, and the detected current and the detected voltage of the output terminal, to the controller 125. The controller 125 uses the detected voltage of the input terminal 126 to compute a transmission efficiency of power received from the source device 110. Additionally, the controller 125 uses the detected current and the detected voltage of the output terminal to compute an amount of power transferred to the load. The controller 114 of the source device 110 determines an amount of power that needs to be transmitted by the source device 110 based on an amount of power required by the load and the amount of power transferred to the load. When the communication unit 124 transfers an amount of power of the output terminal (e.g., the computed amount of power transferred to the load) to the source device 110, the controller 114 of the source device 110 may compute the amount of power that needs to be transmitted by the source device 110.

The communication unit 124 may perform in-band communication for transmitting or receiving data using a resonance frequency by demodulating a received signal obtained by detecting a signal between the target resonator 133 and the rectifier 122, or by detecting an output signal of the rectifier 122. In other words, the controller 125 may demodulate a message received via the in-band communication.

Additionally, the controller 125 may adjust an impedance of the target resonator 133 to modulate a signal to be transmitted to the source device 110. For example, the controller 125 may increase the impedance of the target resonator so that a reflected wave will be detected by the controller 114 of the source device 110. In this example, depending on whether the reflected wave is detected, the controller 114 of the source device 110 will detect a binary number "0" or "1".

The communication unit 124 may transmit, to the source device 110, any one or any combination of a response message including a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a frequency band used the corresponding target device, an amount of power to be used by the corresponding target device, an intrinsic identifier of the corresponding target device, product version information of the corresponding target device, and standards information of the corresponding target device.

The communication unit 124 may also perform an out-of-band communication using a communication channel. The communication unit 124 may include a communication module, such as a ZigBee module, a Bluetooth module, or any other communication module known in the art, that the communication unit 124 may use to transmit or receive data 140 to or from the source device 110 via the out-of-band communication.

The communication unit 124 may receive a wake-up request message from the source device 110, detect an amount of a power received by the target resonator, and transmit, to the source device 110, information about the amount of the power received by the target resonator. In this example, the information about the amount of the power received by the target resonator may correspond to an input voltage value and an input current value of the rectifier 122, an output voltage value and an output current value of the rectifier 122, or an output voltage value and an output current value of the DC/DC converter 123.

The control/communication unit 128 is activated by the wake-up power, and receives, from the source device 110, the wake-up request signal for initial communication. The control/communication unit 128 further transmits, to the source device 110, the response signal corresponding to the wake-up request signal.

Figure 2:
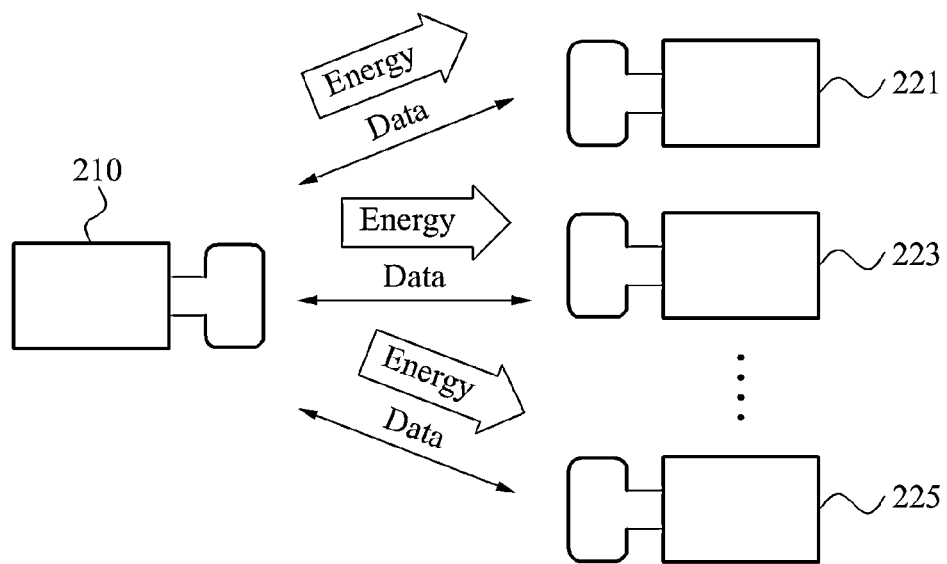
FIG. 2 is a diagram illustrating an example of a multi-target environment.

FIG. 2 is a diagram illustrating an example of a multi-target environment. Referring to FIG. 2, a source device 210 wirelessly and simultaneously transfers energy to target devices, for example, target devices 221, 223, and 225. That is, based on a wireless power transmission system employing a resonance scheme, the source device 210 simultaneously charges the target devices 221, 223, and 225.

Additionally, based on the wireless power transmission system employing the resonance scheme, the source device 210 and the target devices 221, 223, and 225 transmit and receive data using an in-band communication scheme, instead of using an out-band communication scheme. In the in-band communication scheme, power and a signal are transmitted only within a coupling region between a source resonator and a target resonator. In comparison to the out-band communication scheme, the in-band communication scheme may cause an interference in neighboring devices. As described herein, the out-band communication scheme may include communication using a communication channel, for example, a ZigBee channel, a Bluetooth channel, and/or other communication channels known to one of ordinary skill in the art. The in-band communication scheme includes communication using a power transmission channel.

Figure 3:
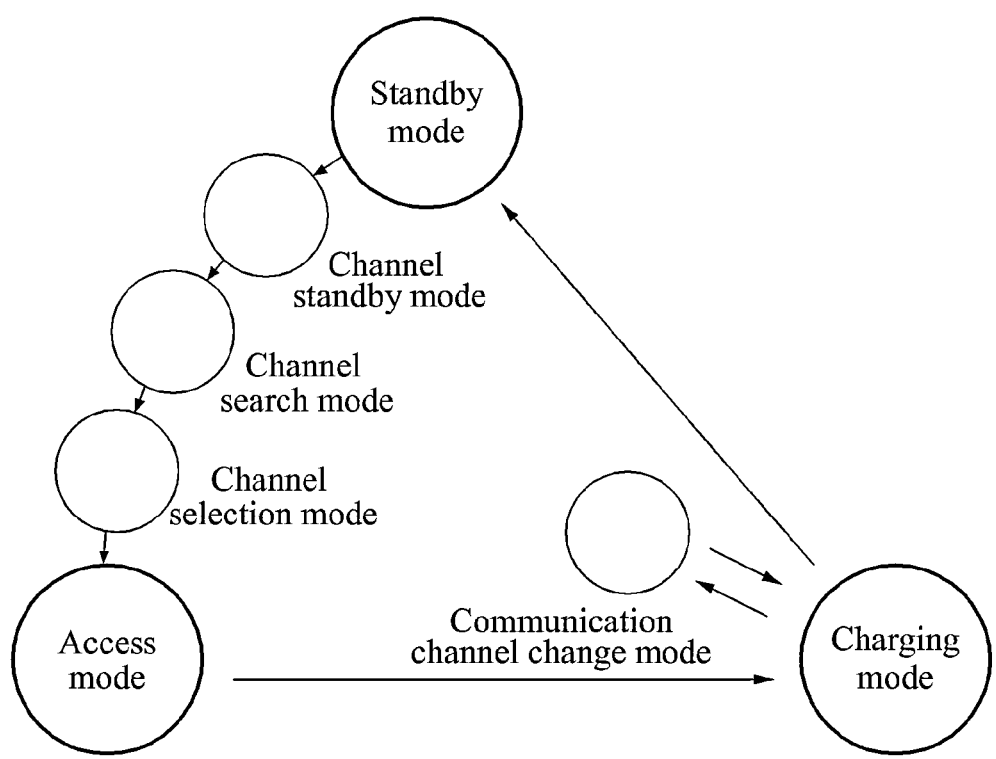
FIG. 3 is a diagram illustrating an example of operating modes of a wireless power transmission system.

FIG. 3 is a diagram illustrating an example of operating modes of a wireless power transmission system. Referring to FIG. 3, the operating modes of the wireless power transmission system are broadly classified into a standby mode, an access mode, and a charging mode.

The standby mode includes a state (e.g., a channel standby mode) in which a source device does not perform any operation, since a target device does not exist in a power transmission region of the source device. When the standby mode is terminated due to a predetermined event (e.g., a target device enters the power transmission region), the source device operates in a channel search mode to search for a communication channel to perform out-band communication and to detect communication channels.

When the communication channels are detected, the source device operates in a channel selection mode to select a communication channel with a best state (e.g., a quality of service (QoS)) from among the communication channels. When the communication channel with the best state is selected, the source device operates in the access mode, which enables the source device and the target device to transmit and receive data through the out-band communication. For example, in the access mode, the source device transmits, to the target device, a wake-up request signal via the selected communication channel.

The charging mode includes a state in which the source device transmits, to the target device operation power. In the charging mode, the source device may further verify a quality of the selected communication channel.

The charging mode may be changed to a communication channel change mode, in which the source device may verify the quality of the selected communication channel, and may transmit, to the target device, a command to request a change in the communication channel based on the verification. Since the communication channel may be changed through the out-band communication, the operation power may continue to be transmitted. The operating modes of FIG. 3 are merely examples, and accordingly, various operating modes may exist.

Figure 4:
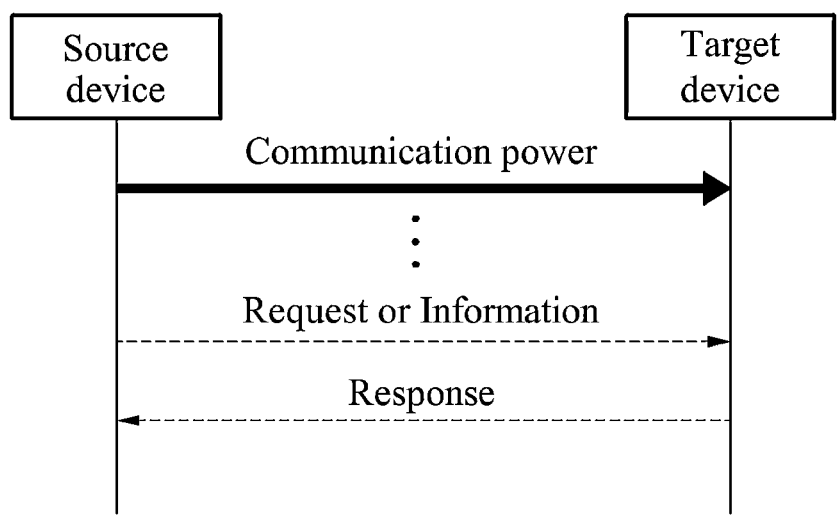
FIG. 4 is a diagram illustrating an example of communication between a source device and a target device.

FIG. 4 is a diagram illustrating an example of communication between a source device and a target device. Referring to FIG. 4, the source device converts a DC voltage to an AC voltage using a resonant frequency to generate communication power, and transmits the communication power to the target device through, e.g., magnetic coupling with the target device. The target device may use the communication power to communicate with other devices. For example, the target device may use the communication power to perform communication with the source device.

In this example, the source device may transmit a request message or an information message to the target device via in-band communication or out-band communication. For example, the request message or the information message may include a field to indicate a start of the request message or the information message, a field to indicate an identifier (ID) of the target device, a field to indicate a command to be transferred to the target device, a check field to check an error in the request message or the information message, and/or other fields known to one of ordinary skill in the art.

The target device may transmit a response message corresponding to the request message or the information message, to the source device via the in-band communication or the out-band communication. The response message may include, for example, a field to indicate a start of the response message, a field to indicate a command to be transferred to the source device, a field to indicate data to be transferred to the source device, a check field to check an error in the response message, and/or other fields known to one of ordinary skill in the art.

Figure 5:
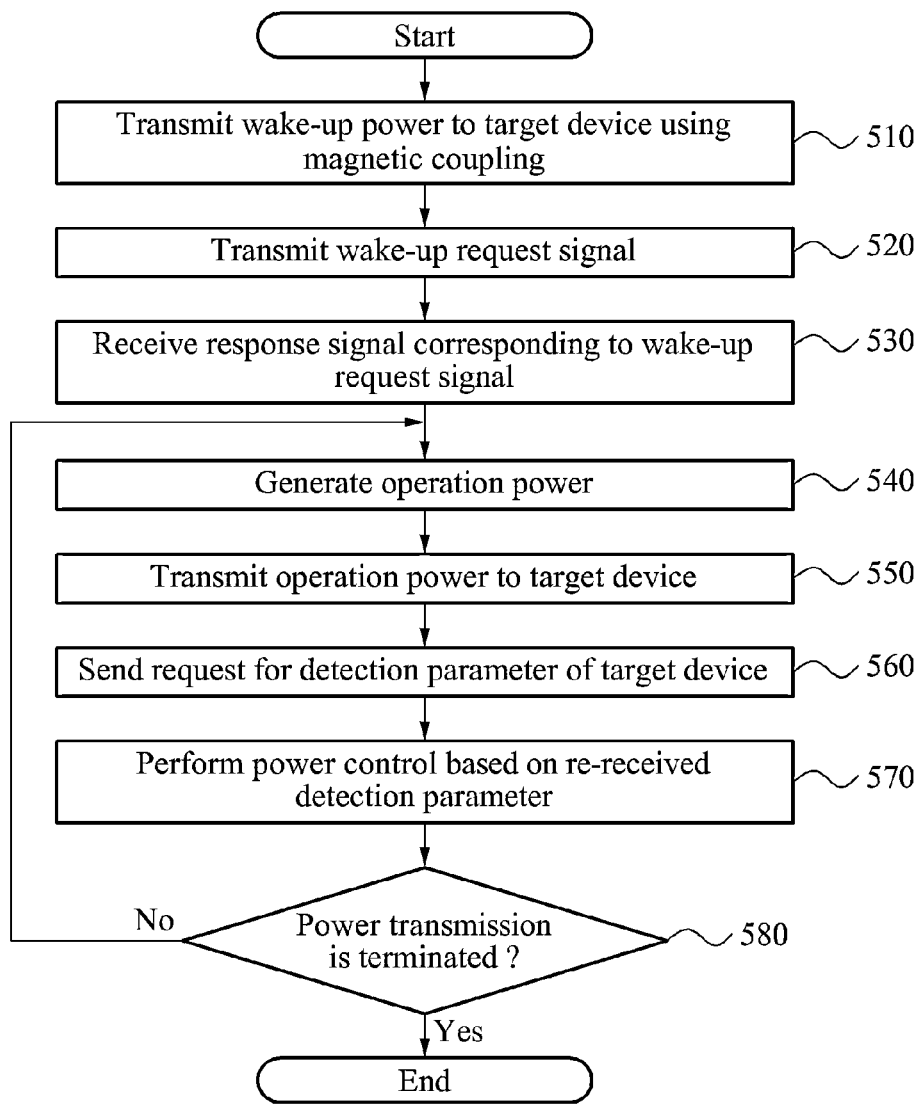
FIG. 5 is a flowchart illustrating an example of a method of controlling power in a wireless power transmission system.

FIG. 5 is a flowchart illustrating an example of a method of controlling power in a wireless power transmission system. The method of FIG. 5 may be performed by a source device, e.g., the source device 110 of FIG. 1.

In operation 510, the source device transmits wake-up power to a target device using magnetic coupling between a source resonator and a target resonator of the source device and the target device, respectively. The target device uses the wake-up power to activate a control function and a communication function of the target device.

In operation 520, the source device transmits, to the target device, a wake-up request signal for initial communication with the target device. In response to the wake-up request signal, the target device transmits, to the source device, a response signal corresponding to the wake-up request signal. The response signal includes a detection parameter of the target device. The detection parameter of the target device may include various measurement values used to determine a power transmission efficiency of the source device. The detection parameter of the target device may include, for example, information regarding an input voltage and an output voltage of a rectifier of the target device, an input current and an output current of the rectifier, an input voltage and an output voltage of a DC/DC converter of the target device, an input current and an output current of the DC/DC converter, and/or a voltage and a current of a battery of the target device.

In operation 530, the source device receives, from the target device, the response signal corresponding to the wake-up request signal. The source device (e.g., the control/communication unit 128 of FIG. 1) detects the detection parameter of the target device based on (e.g., included in) the response signal.

In operation 540, the source device generates operation power based on the detection parameter of the target device. Operation 540 will be further described with reference to FIG. 6 below.

In operation 550, the source device transmits the operation power to the target device using the magnetic coupling. The target device uses the operation power for an operation of the target device.

In operations 550 through 570, the operation power may continue to be transmitted. In other words, the transmission of the operation power, and communication with the target device, may be simultaneously performed via different respective channels.

In operation 560, the source device sends, to the target device, a request for the detection parameter of the target device, to detect the detection parameter of the target device in a charging mode, i.e., as the operation power is transmitted. In response to the request for the detection parameter of the target device, the target device detects the detection parameter, and transmits the detected detection parameter to the source device.

In operation 570, the source device re-receives, from the target device, the detection parameter of the target device, and performs power control based on the re-received detection parameter. The re-received detection parameter may include, for example, the information regarding the input voltage and the output voltage of the rectifier, the input current and the output current of the rectifier, the input voltage and the output voltage of the DC/DC converter, the input current and the output current of the DC/DC converter, and/or the voltage and the current of the battery. To perform the power control, the source device re-generates the operation power based on the re-received detection parameter of the target device. When the power control is performed, the target device receives, from the source device, the operation power generated based on the re-received detection parameter of the target device. Operation 570 will be further described with reference to FIG. 7 below.

In operation 580, the source device determines whether power transmission is terminated. For example, when the target device is sufficiently charged, or when the target device is removed from a power transmission region of the source device, the source device determines that the power transmission is terminated, and the method ends. When the source device determines that the power transmission is not terminated and is continued to be performed, the source device re-performs operations 540 through 570.

Operation 560 may not be performed as needed. For example, when the difference between the phase of the input waveform input into the power amplifier 112 of FIG. 1 and the phase of the input waveform input into the source resonator 131 of FIG. 1 is greater than a predetermined value, the source device 110 of FIG. 1 sends, to the target device, a request for the detection parameter of the target device.

Figure 6:
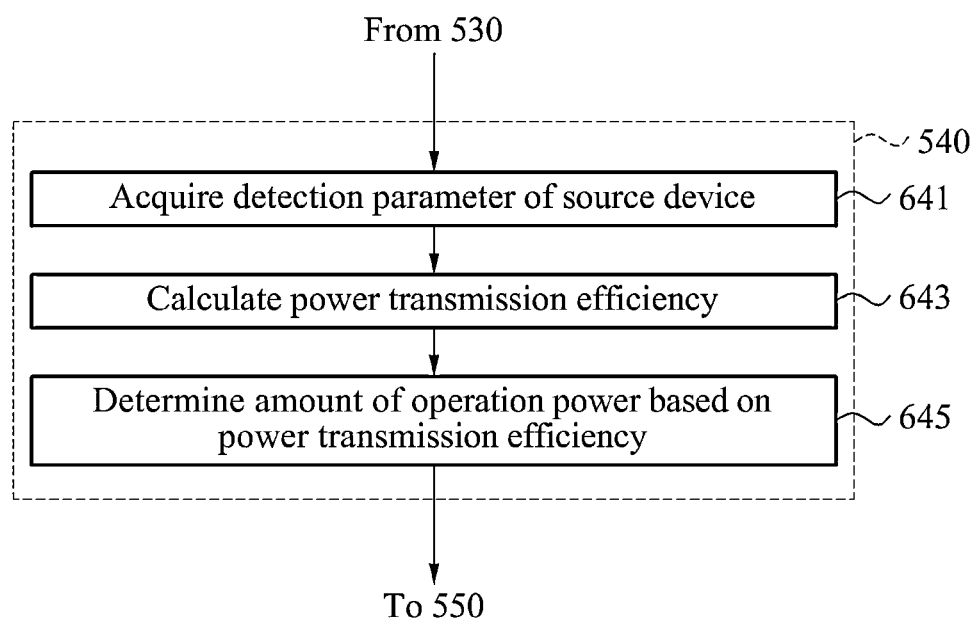
FIG. 6 is a flowchart illustrating an example of an operation of generating operation power in the method of FIG. 5.

FIG. 6 is a flowchart illustrating operation 540 of generating the operation power in the method of FIG. 5.

In operation 641, the source device acquires a detection parameter of the source device that is associated with an amount of the wake-up power. The detection parameter of the source device may include, for example, information regarding an input voltage and an input current of a power amplifier of the source device, and/or an output voltage and an output current of the power amplifier. Additionally, the detection parameter of the source device may further include, for example, information regarding an input voltage and an output voltage of a variable SMPS of the source device, and/or an input current and an output current of the variable SMPS.

In operation 643, the source device calculates a power transmission efficiency of the source device based on the detection parameter of the source device and the detection parameter of the target device. For example, the source device may determine an amount of transmitted power of the source device based on the detection parameter of the source device. Additionally, the source device may determine an amount of received power of the target device based on the detection parameter of the target device. The source device may determine a ratio of the amount of the transmitted power to the amount of the received power that may correspond to the power transmission efficiency.

In operation 645, the source device determines an amount of the operation power based on the power transmission efficiency. For example, when power of 100 W is required to operate the target device, and when the power transmission efficiency is 90%, the amount of the operation power may be determined to be 100/0.9 W, or about 111 W. That is, the amount of the operation power may be determined to be a ratio of the power required to operate the target device, to the power transmission efficiency. In this example, information on an amount of power required to operate the target device may be predetermined, or may be determined from the target device via the communication.

Figure 7:
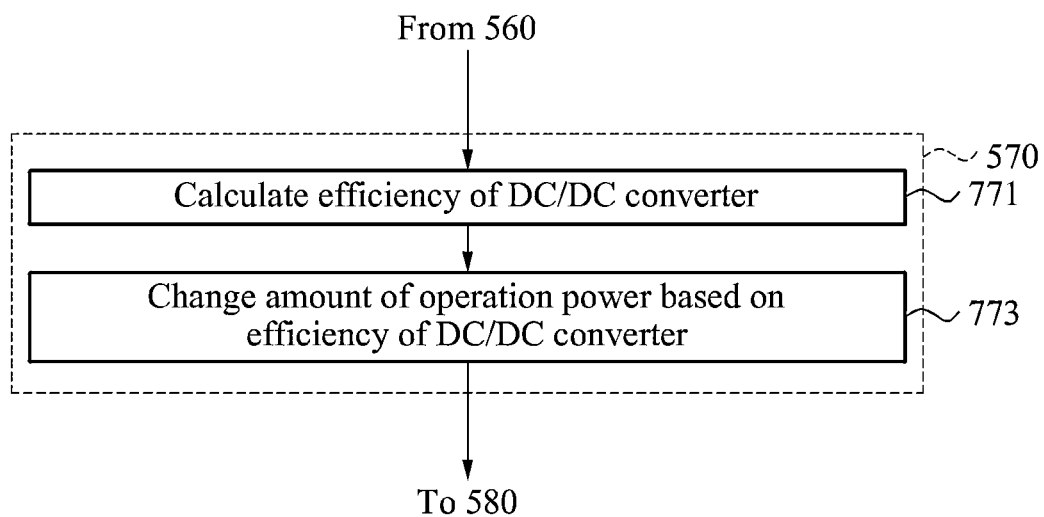
FIG. 7 is a flowchart illustrating an example of an operation of performing power control in the method of FIG. 5.

FIG. 7 is a flowchart illustrating operation 570 of performing the power control in the method of FIG. 5.

In operation 771, the source device calculates an efficiency of the DC/DC converter based on the input current and the output current of the DC/DC converter that are included in the re-received detection parameter of the target device.

In operation 773, the source device changes the amount of the operation power based on the efficiency of the DC/DC converter. In an example in which the efficiency of the DC/DC converter is less than a predetermined value, the source device may increase the amount of the operation power. In another example in which the efficiency of the DC/DC converter is greater than or equal to the predetermined value, the source device may not change the amount of the operation power.

FIG. 8 is a diagram illustrating examples of commands used to perform communication between a source device and a target device. The commands of FIG. 8 are merely examples, and accordingly, a length of a code for the commands may be increased from 4 bits to 8 bits, 12 bits, or of bits, and additional commands may be added. For example, although not another amount illustrated in FIG. 8, a command to verify an amount of power to be transmitted to the target device may be added.

Reset Command, 0001

The reset command is used by the source device to request a reset of the target device, upon occurrence of an error in an operation of the target device. For example, when the reset command is received, the target device may transmit an acknowledge (ACK) to the source device. Additionally, in response to the reset command, the target device resets a system.

Rectifier Input Voltage/Current Request Command, 0010

The rectifier input voltage/current request command is used by the source device to verify a power reception state of the target device. In more detail, the rectifier input voltage/current request command is used by the source device to request an input voltage and an input current of a rectifier in the target device.

Rectifier Input Voltage/Current Response Command, 0010

The rectifier input voltage/current response command is used by the target device to respond to the rectifier input voltage/current request command. Accordingly, the rectifier input voltage/current response command corresponds to a response message to the request for the input voltage and the input current of the rectifier. For example, when a packet including "0010" inserted into a predetermined field is received, the target device measures the input voltage and the input current of the rectifier. In this example, the input voltage and input current of the rectifier may correspond to an output voltage and an output current of the rectifier 122 of FIG. 1. Additionally, the input voltage and the input current of the rectifier may correspond to an input voltage and an input current of the rectifier 122 of FIG. 1. The source device may determine a power transmission efficiency of the source device based on the measured input voltage and the measured input current of the rectifier. For example, the source device may determine an amount of received power of the target device based on the measured input voltage and the measured input current of the rectifier, and may determine the power transmission efficiency based on a proportion of the amount of the received power to an amount of transmitted power of the source device.

DC/DC Output Voltage/Current Request Command, 0011

The DC/DC output voltage/current request command is used by the source device to verify an amount of power supplied to a load of the target device. In more detail, the DC/DC output voltage/current request command is used by the source device to request an output voltage and an output current of a DC/DC converter in the target device.

To determine an efficiency of the DC/DC converter, the source device requests the target device to transmit information on the output voltage and the output current of the DC/DC converter. For example, the source device 110 of FIG. 1 determines an efficiency of the DC/DC converter 123 of FIG. 1 based on information on input power and output power of the DC/DC converter 123.

DC/DC Output Voltage/Current Response Command, 0011

The DC/DC output voltage/current response command is used by the target device to respond to the DC/DC output voltage/current request command. Accordingly, the DC/DC output voltage/current response command corresponds to a response message to the request for the output voltage and the output current of the DC/DC converter.

ACK Command, 0100

The ACK command is used by the source device and the target device to acknowledge reception of a message.

NACK Command, 1001

The NACK command is used by the source device and the target device in a case where an error occurs in a received message.

Power-on Request Command, 0101

The power-on request command is used by the source device to instruct the target device to supply power to the load of the target device. For example, when the power-on request command is received, the target device initiates a power supply to the load.

Power-Off Request Command, 0110

The power-off request command is used by the source device to request interruption of the power supply to the load. For example, when the power-off request command is received, the target device interrupts the power supply to the load. The source device may use the power-off request command when a power supply to a predetermined target device among target devices needs to be interrupted. For example, the source device may transmit the power-off request command to a target device including a power transmission efficiency that is less than a predetermined level, among the target devices.

Target State Information Request Command, 0111

The target state information request command is used by the source device to request state information of the target device. For example, when a charging state, temperature, and/or other state information of the target device are to be verified, the source device may insert "0111" into a predetermined field, and may transmit, to the target device, a packet in which "0111" is inserted. The source device may transmit, to the target device, a wake-up request signal including the target state information request command. The source device may compare a time in which the wake-up request signal including the target state information request command is transmitted, with a time to respond to the wake-up request signal, and may detect a target device located within a power transmission region of the source device.

Target State Information Response Command, 0111

The target state information response command corresponds to a response message to the request for the state information of the target device.

Access Standard Command, 1000

The access standard command is used by the source device to transfer a predetermined communication rule to the target device. For example, the source device may transmit, to target devices, a communication period, a communication slot, a response rule, and/or other communication rules known to one of ordinary skill in the art, through the access standard command.

Target Device Registration Information Request Command, 1110

The source device uses the target device registration information request command to request registration information of the target device. The registration information of the target device may include system information of the target device. For example, the registration information of the target device may include a type of a product, such as a TV, a camera, a cellular phone, and/or other types of products known to one of ordinary skill in the art, manufacturer information, a product model name, a battery type, a charging scheme, an impedance value of a load, information on a characteristic of a target resonator, information on a used frequency band, an amount of power to be consumed, an intrinsic ID, product version information or standards information, and/or other information known to one of ordinary skill in the art. In this example, the intrinsic ID may include an N-byte serial number, and also may include a short ID generated by converting the N-byte serial number to an M-bit serial number. The information on the characteristic of the target resonator may include, for example, a Q-value and a K-value of the target resonator. Additionally, the information on the characteristic of the target resonator may include, for example, information on a type of the target resonator, such as a resonator including a two-dimensional (2D) structure, or a resonator including a three-dimensional (3D) structure, an L/C value of the target resonator, impedance matching information, and/or other information known to one of ordinary skill in the art.

Target Device Registration Information Response Command, 1110

The target device uses the target device registration information response command as a response to the target device registration information request command. Accordingly, the target device registration information response command corresponds to a response message to a request for the registration information of the target device.

Target Resonator on/Off Request Command

The target resonator on/off request command is used to control a target resonator to be powered on and off. For example, the target resonator on/off request command may use a code such as "0000", a code that is set in advance, or a code reserved for future use such as "1010" or "1111".

Additionally, different codes may be used for a command to control the target resonator to be powered on, and a command to control the target resonator to be powered off. For example, when a target resonator of a predetermined target device among target devices, is requested to be powered off, the source device may transmit, to the predetermined target device, the command to control the target resonator to be powered off.

In response to the command to control the target resonator to be powered off, the predetermined target device may control the target resonator to be powered off. For example, the target device may control the target resonator 133 of FIG. 1 to be powered off, by disconnecting the target resonator 133 from the rectifier 122, or disconnecting the rectifier 122 from the DC/DC converter 123. When the target resonator is powered off, magnetic coupling between a source resonator and the target resonator may disappear.

Additional Use of Commands

Various commands other than the commands of FIG. 8 may be additionally used. For example, a command to request a wake-up time of the target device may be used. The wake-up time may include a time in which a controller or a communication module of the target device is activated. Such commands may use a code reserved for future use, such as "1010" or "1111".

Figure 9A:
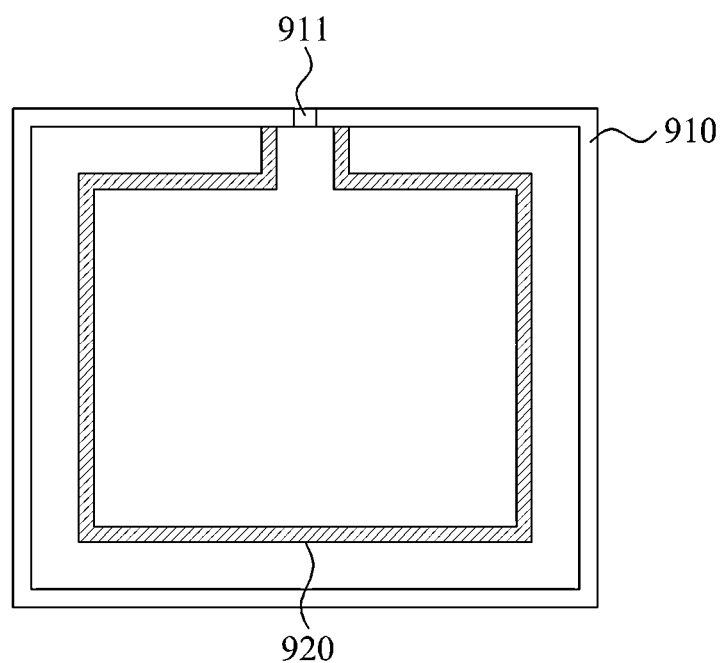
FIGS. 9A and 9B are diagrams illustrating an example of a resonator and a feeder of a wireless power transmitter.
Figure 9B:
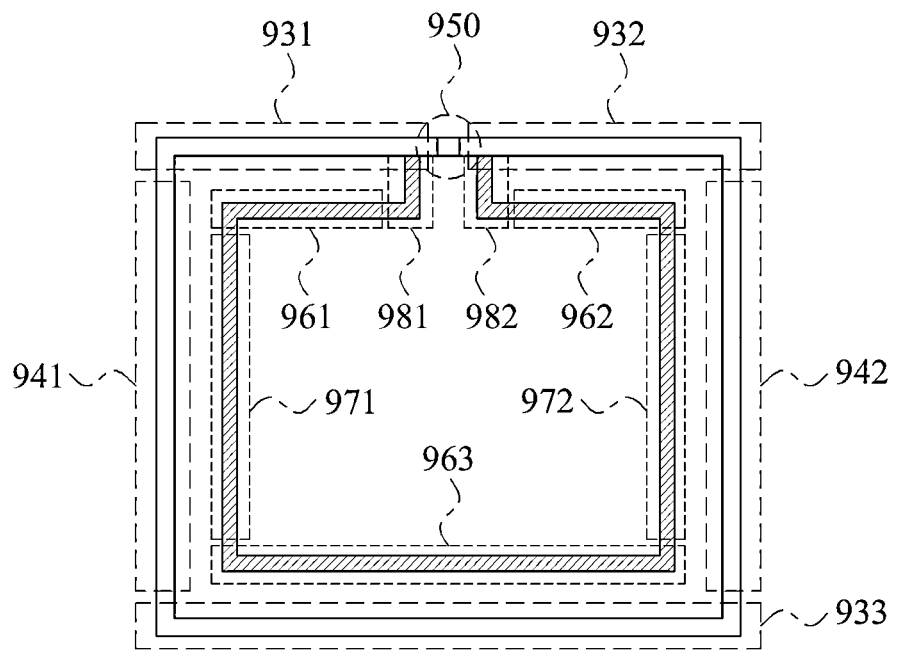

FIGS. 9A and 9B are diagrams illustrating an example of a resonator and a feeder of a wireless power transmitter. Referring to FIG. 9A, the wireless power transmitter includes a resonator 910 and a feeder 920. The resonator 910 further includes a capacitor 911. The feeder 920 is electrically connected to both ends of the capacitor 911.

FIG. 9B illustrates, in greater detail, a structure of the wireless power transmitter of FIG. 9A. The resonator 910 includes a first transmission line (not identified by a reference numeral in FIG. 9B, but formed by various elements in FIG. 9B as discussed below), a first conductor 941, a second conductor 942, and at least one capacitor 950.

The capacitor 950 is inserted in series between a first signal conducting portion 931 and a second signal conducting portion 932, causing an electric field to be confined within the capacitor 950. Generally, a transmission line includes at least one conductor in an upper portion of the transmission line, and at least one conductor in a lower portion of first transmission line. A current may flow through the at least one conductor disposed in the upper portion of the first transmission line, and the at least one conductor disposed in the lower portion of the first transmission line may be electrically grounded. In this example, a conductor disposed in an upper portion of the first transmission line in FIG. 9B is separated into two portions that will be referred to as the first signal conducting portion 931 and the second signal conducting portion 932. A conductor disposed in a lower portion of the first transmission line in FIG. 9B will be referred to as a first ground conducting portion 933.

As illustrated in FIG. 9B, the resonator 910 has a generally two-dimensional (2D) structure. The first transmission line includes the first signal conducting portion 931 and the second signal conducting portion 932 in the upper portion of the first transmission line, and includes the first ground conducting portion 933 in the lower portion of the first transmission line. The first signal conducting portion 931 and the second signal conducting portion 932 are disposed to face the first ground conducting portion 933. A current flows through the first signal conducting portion 931 and the second signal conducting portion 932.

One end of the first signal conducting portion 931 is connected to one end of the first conductor 941, the other end of the first signal conducting portion 931 is connected to the capacitor 950, and the other end of the first conductor 941 is connected to one end of the first ground conducting portion 933. One end of the second signal conducting portion 932 is connected to one end of the second conductor 942, the other end of the second signal conducting portion 932 is connected to the other end of the capacitor 950, and the other end of the second conductor 942 is connected to the other end of the ground conducting portion 933. Accordingly, the first signal conducting portion 931, the second signal conducting portion 932, the first ground conducting portion 933, the first conductor 941, and the second conductor 942 are connected to each other, causing the resonator 910 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

The capacitor 950 is inserted into an intermediate portion of the first transmission line. In the example in FIG. 9B, the capacitor 950 is inserted into a space between the first signal conducting portion 931 and the second signal conducting portion 932. The capacitor 950 may be a lumped element capacitor, a distributed capacitor, or any other type of capacitor known to one of ordinary skill in the art. For example, a distributed element capacitor may include a zigzagged conductor line and a dielectric material having a relatively high permittivity disposed between parallel portions of the zigzagged conductor line.

The capacitor 950 inserted into the first transmission line may cause the resonator 910 to have a characteristic of a metamaterial. A metamaterial is a material having a predetermined electrical property that is not found in nature, and thus may have an artificially designed structure. All materials existing in nature have a magnetic permeability and permittivity. Most materials have a positive magnetic permeability and/or a positive permittivity.

For most materials, a right-hand rule may be applied to an electric field, a magnetic field, and a Poynting vector of the materials, so the materials may be referred to as right-handed materials (RHMs). However, a metamaterial that has a magnetic permeability and/or a permittivity that is not found in nature, and may be classified into an epsilon negative (ENG) material, a mu negative (MNG) material, a double negative (DNG) material, a negative refractive index (NRI) material, a left-handed (LH) material, and other metamaterial classifications known to one of ordinary skill in the art based on a sign of the magnetic permeability of the metamaterial and a sign of the permittivity of the metamaterial.

If the capacitor 950 is a lumped element capacitor and a capacitance of the capacitor 950 is appropriately determined, the resonator 910 may have a characteristic of a metamaterial. If the resonator 910 is caused to have a negative magnetic permeability by appropriately adjusting the capacitance of the capacitor 950, the resonator 910 may also be referred to as an MNG resonator. Various criteria may be applied to determine the capacitance of the capacitor 950. For example, the various criteria may include a criterion for enabling the resonator 910 to have the characteristic of the metamaterial, a criterion for enabling the resonator 910 to have a negative magnetic permeability at a target frequency, a criterion for enabling the resonator 910 to have a zeroth order resonance characteristic at the target frequency, and any other suitable criterion. Based on any one or any combination of the aforementioned criteria, the capacitance of the capacitor 950 may be appropriately determined.

The resonator 910, hereinafter referred to as the MNG resonator 910, may have a zeroth order resonance characteristic of having a resonance frequency when a propagation constant is "0". If the MNG resonator 910 has the zeroth order resonance characteristic, the resonance frequency is independent of a physical size of the MNG resonator 910. By changing the capacitance of the capacitor 950, the resonance frequency of the MNG resonator 910 may be changed without changing the physical size of the MNG resonator 910.

In a near field, the electric field is concentrated in the capacitor 950 inserted into the first transmission line, causing the magnetic field to become dominant in the near field. The MNG resonator 910 has a relatively high Q-factor when the capacitor 950 is a lumped element, thereby increasing a power transmission efficiency. The Q-factor indicates a level of an ohmic loss or a ratio of a reactance with respect to a resistance in the wireless power transmission. As will be understood by one of ordinary skill in the art, the efficiency of the wireless power transmission will increase as the Q-factor increases.

Although not illustrated in FIG. 9B, a magnetic core passing through the MNG resonator 910 may be provided to increase a power transmission distance.

Referring to FIG. 9B, the feeder 920 includes a second transmission line (not identified by a reference numeral in FIG. 9B, but formed by various elements in FIG. 9B as discussed below), a third conductor 971, a fourth conductor 972, a fifth conductor 981, and a sixth conductor 982.

The second transmission line includes a third signal conducting portion 961 and a fourth signal conducting portion 962 in an upper portion of the second transmission line, and includes a second ground conducting portion 963 in a lower portion of the second transmission line. The third signal conducting portion 961 and the fourth signal conducting portion 962 are disposed to face the second ground conducting portion 963. A current flows through the third signal conducting portion 961 and the fourth signal conducting portion 962.

One end of the third signal conducting portion 961 is connected to one end of the third conductor 971, the other end of the third signal conducting portion 961 is connected to one end of the fifth conductor 981, and the other end of the third conductor 971 is connected to one end of the second ground conducting portion 963. One end of the fourth signal conducting portion 962 is connected to one end of the fourth conductor 972, the other end of the fourth signal conducting portion 962 is connected to one end the sixth conductor 982, and the other end of the fourth conductor 972 is connected to the other end of the second ground conducting portion 963. The other end of the fifth conductor 981 is connected to the first signal conducting portion 931 at or near where the first signal conducting portion 931 is connected to one end of the capacitor 950, and the other end of the sixth conductor 982 is connected to the second signal conducting portion 932 at or near where the second signal conducting portion 932 is connected to the other end of the capacitor 950. Thus, the fifth conductor 981 and the sixth conductor 982 are connected in parallel to both ends of the capacitor 950. The fifth conductor 981 and the sixth conductor 982 are used as an input port to receive an RF signal as an input.

Accordingly, the third signal conducting portion 961, the fourth signal conducting portion 962, the second ground conducting portion 963, the third conductor 971, the fourth conductor 972, the fifth conductor 981, the sixth conductor 982, and the resonator 910 are connected to each other, causing the resonator 910 and the feeder 920 to have an electrically closed loop structure. The term "loop structure" includes a polygonal structure, a circular structure, a rectangular structure, and any other geometrical structure that is closed, i.e., that does not have any opening in its perimeter. The expression "having a loop structure" indicates a structure that is electrically closed.

If an RF signal is input to the fifth conductor 981 or the sixth conductor 982, input current flows through the feeder 920 and the resonator 910, generating a magnetic field that induces a current in the resonator 910. A direction of the input current flowing through the feeder 920 is identical to a direction of the induced current flowing through the resonator 910, thereby causing a strength of a total magnetic field to increase in the center of the resonator 910, and decrease near the outer periphery of the resonator 910.

An input impedance is determined by an area of a region between the resonator 910 and the feeder 920. Accordingly, a separate matching network used to match the input impedance to an output impedance of a power amplifier may not be necessary. However, if a matching network is used, the input impedance may be adjusted by adjusting a size of the feeder 920, and accordingly a structure of the matching network may be simplified. The simplified structure of the matching network may reduce a matching loss of the matching network.

The second transmission line, the third conductor 971, the fourth conductor 972, the fifth conductor 981, and the sixth conductor 982 of the feeder 920 may have a structure identical to the structure of the resonator 910. For example, if the resonator 910 has a loop structure, the feeder 920 may also have a loop structure. As another example, if the resonator 910 has a circular structure, the feeder 920 may also have a circular structure.

Figure 10A:
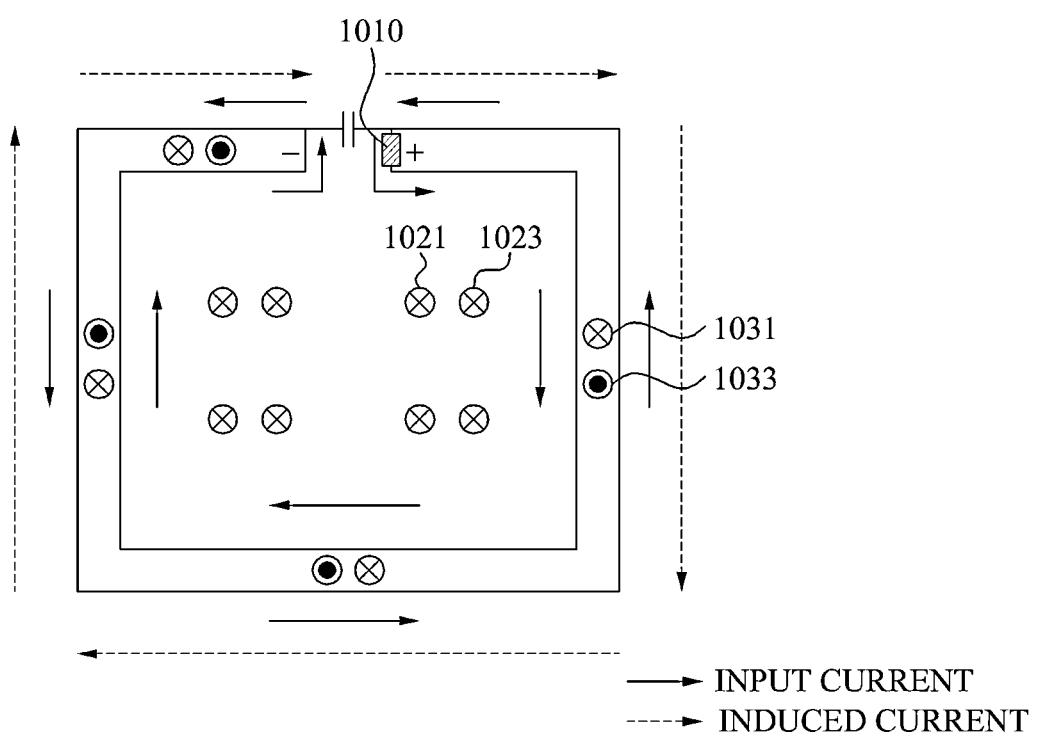
FIG. 10A is a diagram illustrating an example of a distribution of a magnetic field in a resonator that is produced by feeding of a feeder, of a wireless power transmitter.

FIG. 10A is a diagram illustrating an example of a distribution of a magnetic field in a resonator that is produced by feeding of a feeder, of a wireless power transmitter. FIG. 10A more simply illustrates the resonator 910 and the feeder 920 of FIGS. 9A and 9B, and the names of the various elements in FIG. 9B will be used in the following description of FIG. 10A without reference numerals.

A feeding operation may be an operation of supplying power to a resonator in wireless power transmission, or an operation of supplying AC power to a rectifier in wireless power transmission. FIG. 10A illustrates a direction of input current flowing in the feeder, and a direction of induced current flowing in the resonator. Additionally, FIG. 10A illustrates a direction of a magnetic field formed by the input current of the feeder, and a direction of a magnetic field formed by the induced current of the resonator.

Referring to FIG. 10A, the fifth conductor or the sixth conductor of the feeder 920 may be used as an input port 1010. In FIG. 10A, the sixth conductor of the feeder is being used as the input port 1010. An RF signal is input to the input port 1010. The RF signal may be output from a power amplifier. The power amplifier may increase and decrease an amplitude of the RF signal based on a power requirement of a target device. The RF signal input to the input port 1010 is represented in FIG. 10A as an input current flowing in the feeder. The input current flows in a clockwise direction in the feeder along the second transmission line of the feeder. The fifth conductor and the sixth conductor of the feeder are electrically connected to the resonator. More specifically, the fifth conductor of the feeder is connected to the first signal conducting portion of the resonator, and the sixth conductor of the feeder is connected to the second signal conducting portion of the resonator. Accordingly, the input current flows in both the resonator and the feeder. The input current flows in a counterclockwise direction in the resonator along the first transmission line of the resonator. The input current flowing in the resonator generates a magnetic field, and the magnetic field induces a current in the resonator due to the magnetic field. The induced current flows in a clockwise direction in the resonator along the first transmission line of the resonator. The induced current in the resonator transfers energy to the capacitor of the resonator, and also generates a magnetic field. In FIG. 10A, the input current flowing in the feeder and the resonator is indicated by solid lines with arrowheads, and the induced current flowing in the resonator is indicated by dashed lines with arrowheads.

A direction of a magnetic field generated by a current is determined based on the right-hand rule. As illustrated in FIG. 10A, within the feeder, a direction 1021 of the magnetic field generated by the input current flowing in the feeder is identical to a direction 1023 of the magnetic field generated by the induced current flowing in the resonator. Accordingly, a strength of the total magnetic field may increases inside the feeder.

In contrast, as illustrated in FIG. 10A, in a region between the feeder and the resonator, a direction 1033 of the magnetic field generated by the input current flowing in the feeder is opposite to a direction 1031 of the magnetic field generated by the induced current flowing in the resonator. Accordingly, the strength of the total magnetic field decreases in the region between the feeder and the resonator.

Typically, in a resonator having a loop structure, a strength of a magnetic field decreases in the center of the resonator, and increases near an outer periphery of the resonator. However, referring to FIG. 10A, since the feeder is electrically connected to both ends of the capacitor of the resonator, the direction of the induced current in the resonator is identical to the direction of the input current in the feeder. Since the direction of the induced current in the resonator is identical to the direction of the input current in the feeder, the strength of the total magnetic field increases inside the feeder, and decreases outside the feeder. As a result, due to the feeder, the strength of the total magnetic field increases in the center of the resonator having the loop structure, and decreases near an outer periphery of the resonator, thereby compensating for the normal characteristic of the resonator having the loop structure in which the strength of the magnetic field decreases in the center of the resonator, and increases near the outer periphery of the resonator. Thus, the strength of the total magnetic field may be constant inside the resonator.

A power transmission efficiency for transferring wireless power from a source resonator to a target resonator is proportional to the strength of the total magnetic field generated in the source resonator. Accordingly, when the strength of the total magnetic field increases inside the source resonator, the power transmission efficiency also increases.

Figure 10B:
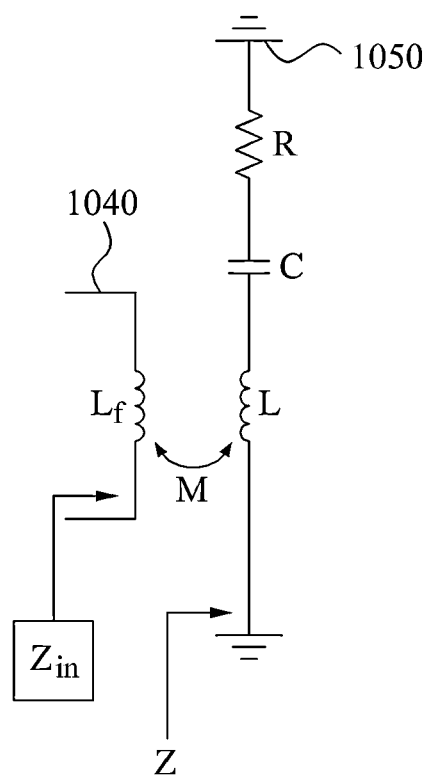
FIG. 10B is a diagram illustrating examples of equivalent circuits of a feeder and a resonator of a wireless power transmitter.

FIG. 10B is a diagram illustrating examples of equivalent circuits of a feeder and a resonator of a wireless power transmitter. Referring to FIG. 10B, a feeder 1040 and a resonator 1050 may be represented by the equivalent circuits in FIG. 10B. The feeder 1040 is represented as an inductor having an inductance $L_f$, and the resonator 1050 is represented as a series connection of an inductor having an inductance L coupled to the inductance $L_f$ of the feeder 1040 by a mutual inductance M, a capacitor having a capacitance C, and a resistor having a resistance R. An example of an input impedance $Z_{in}$ viewed in a direction from the feeder 1040 to the resonator 1050 may be expressed by the following Equation 1:

$$Z_{in} = \frac{(\omega M)^2}{Z} \quad (1)$$

In Equation 1, M denotes a mutual inductance between the feeder 1040 and the resonator 1050, $\omega$ denotes a resonance frequency of the feeder 1040 and the resonator 1050, and Z denotes an impedance viewed in a direction from the resonator 1050 to a target device. As can be seen from Equation 1, the input impedance $Z_{in}$ is proportional to the square of the mutual inductance M. Accordingly, the input impedance $Z_{in}$ may be adjusted by adjusting the mutual inductance M. The mutual inductance M depends on an area of a region between the feeder 1040 and the resonator 1050. The area of the region between the feeder 1040 and the resonator 1050 may be adjusted by adjusting a size of the feeder 1040, thereby adjusting the mutual inductance M and the input impedance $Z_{in}$. Since the input impedance $Z_{in}$ may be adjusted by adjusting the size of the feeder 1040, it may be unnecessary to use a separate matching network to perform impedance matching with an output impedance of a power amplifier.

In a target resonator and a feeder included in a wireless power receiver, a magnetic field may be distributed as illustrated in FIG. 10A. For example, the target resonator may receive wireless power from a source resonator via magnetic coupling. The received wireless power induces a current in the target resonator. The induced current in the target resonator generates a magnetic field, which induces a current in the feeder. If the target resonator is connected to the feeder as illustrated in FIG. 10A, a direction of the induced current flowing in the target resonator will be identical to a direction of the induced current flowing in the feeder. Accordingly, for the reasons discussed above in connection with FIG. 10A, a strength of the total magnetic field will increase inside the feeder, and will decrease in a region between the feeder and the target resonator.

Figure 11:
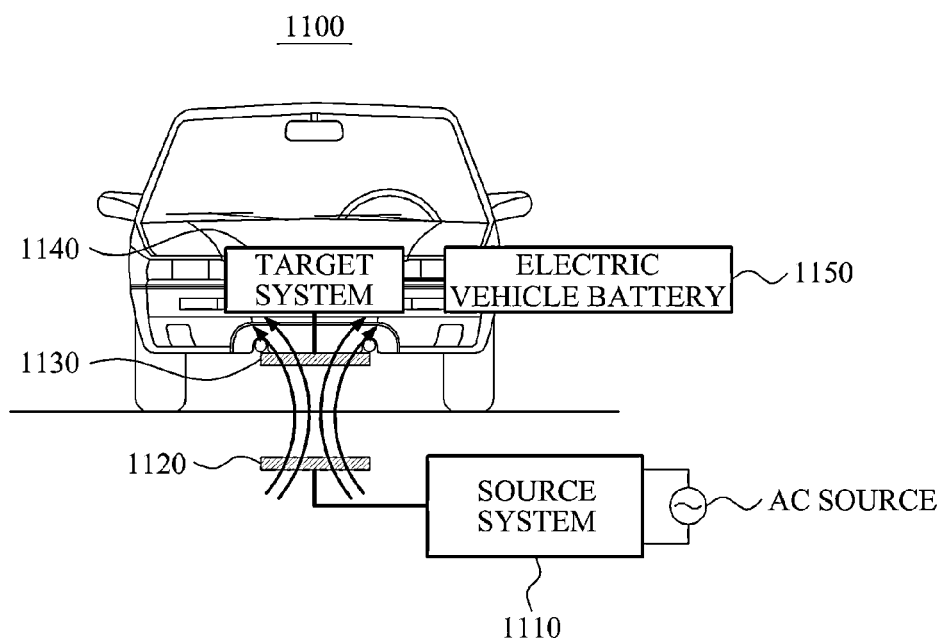
FIG. 11 is a diagram illustrating an example of an electric vehicle charging system.

FIG. 11 is a diagram illustrating an example of an electric vehicle charging system. Referring to FIG. 11, an electric vehicle charging system 1100 includes a source system 1110, a source resonator 1120, a target resonator 1130, a target system 1140, and an electric vehicle battery 1150.

In one example, the electric vehicle charging system 1100 has a structure similar to the structure of the wireless power transmission system of FIG. 1. The source system 1110 and the source resonator 1120 in the electric vehicle charging system 1100 operate as a source. The target resonator 1130 and the target system 1140 in the electric vehicle charging system 1100 operate as a target.

In one example, the source system 1110 includes an alternating current-to-direct current (AC/DC) converter, a power detector, a power converter, a control and communication (control/communication) unit similar to those of the source device 110 of FIG. 1. In one example, the target system 1140 includes a rectifier, a DC-to-DC (DC/DC) converter, a switch unit, a charging unit, and a control/communication unit similar to those of the target device 120 of FIG. 1. The electric vehicle battery 1150 is charged by the target system 1140. The electric vehicle charging system 1100 may use a resonant frequency in a band of a few kHz to tens of MHz.

The source system 1110 generates power based on a type of the vehicle being charged, a capacity of the electric vehicle battery 1150, and a charging state of the electric vehicle battery 1150, and wirelessly transmits the generated power to the target system 1140 via a magnetic coupling between the source resonator 1120 and the target resonator 1130.

The source system 1110 may control an alignment of the source resonator 1120 and the target resonator 1130. For example, when the source resonator 1120 and the target resonator 1130 are not aligned, the controller of the source system 1110 may transmit a message to the target system 1140 to control the alignment of the source resonator 1120 and the target resonator 1130.

For example, when the target resonator 1130 is not located in a position enabling maximum magnetic coupling, the source resonator 1120 and the target resonator 1130 are not properly aligned. When a vehicle does not stop at a proper position to accurately align the source resonator 1120 and the target resonator 1130, the source system 1110 may instruct a position of the vehicle to be adjusted to control the source resonator 1120 and the target resonator 1130 to be aligned. However, this is just an example, and other methods of aligning the source resonator 1120 and the target resonator 1130 may be used.

The source system 1110 and the target system 1140 may transmit or receive an ID of a vehicle and exchange various messages by performing communication with each other.

The descriptions of FIGS. 2 through 10B are also applicable to the electric vehicle charging system 1100. However, the electric vehicle charging system 1100 may use a resonant frequency in a band of a few kHz to tens of MHz, and may wirelessly transmit power that is equal to or higher than tens of watts to charge the electric vehicle battery 1150.

Figure 12A:
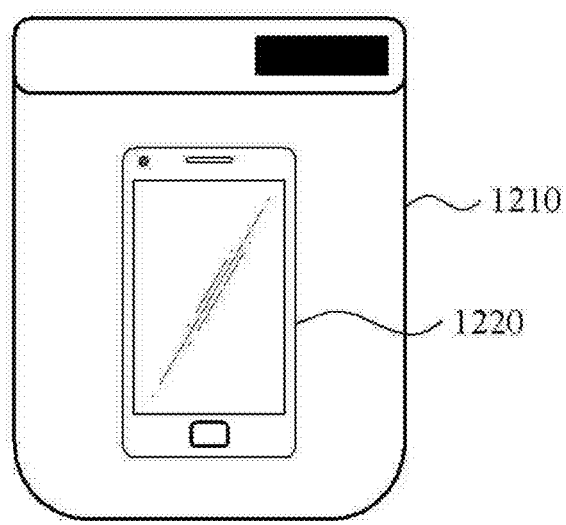
FIGS. 12A through 13B are diagrams illustrating examples of applications in which a wireless power receiver and a wireless power transmitter are mounted.

FIGS. 12A through 13B are diagrams illustrating examples of applications in which a wireless power receiver and a wireless power transmitter are mounted. FIG. 12A illustrates an example of wireless power charging between a pad 1210 and a mobile terminal 1220, and FIG. 12B illustrates an example of wireless power charging between pads 1230 and 1240 and hearing aids 1250 and 1260, respectively.

Referring to FIG. 12A, a wireless power transmitter is mounted in the pad 1210, and a wireless power receiver is mounted in the mobile terminal 1220. The pad 1210 charges a single mobile terminal, namely, the mobile terminal 1220.

Figure 12B:
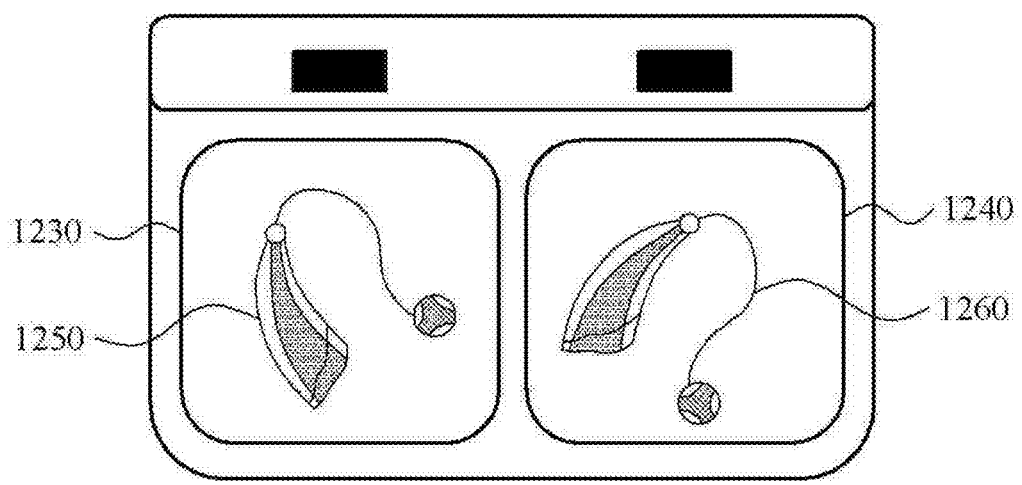

Referring to FIG. 12B, two wireless power transmitters are respectively mounted in the pads 1230 and 1240. The hearing aids 1250 and 1260 are used for a left ear and a right ear, respectively. Two wireless power receivers are respectively mounted in the hearing aids 1250 and 1260. The pads 1230 and 1240 charge two hearing aids, respectively, namely, the hearing aids 1250 and 1260.

Figure 13A:
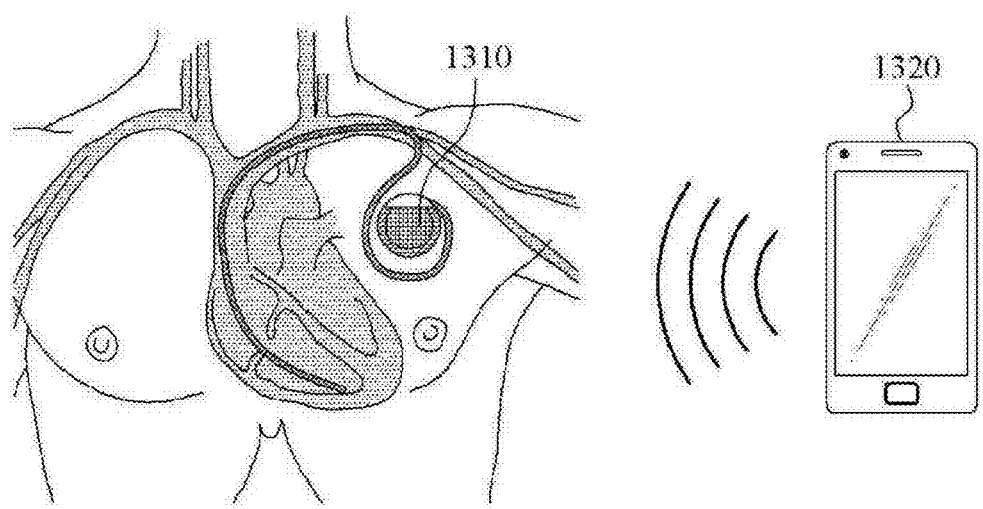
Figure 13B:
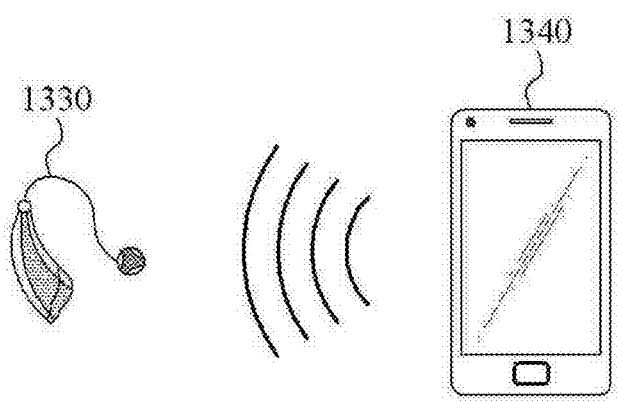

FIG. 13A illustrates an example of wireless power charging between an electronic device 1310 inserted into a human body, and a mobile terminal 1320. FIG. 13B illustrates an example of wireless power charging between a hearing aid 1330 and a mobile terminal 1340.

Referring to FIG. 13A, a wireless power transmitter and a wireless power receiver are mounted in the mobile terminal 1320. Another wireless power receiver is mounted in the electronic device 1310. The electronic device 1310 is charged by receiving power from the mobile terminal 1320.

Referring to FIG. 13B, a wireless power transmitter and a wireless power receiver are mounted in the mobile terminal 1340. Another wireless power receiver is mounted in the hearing aid 1330. The hearing aid 1330 is charged by receiving power from the mobile terminal 1340. Low-power electronic devices, for example, Bluetooth earphones, may also be charged by receiving power from the mobile terminal 1340.

Figure 14:
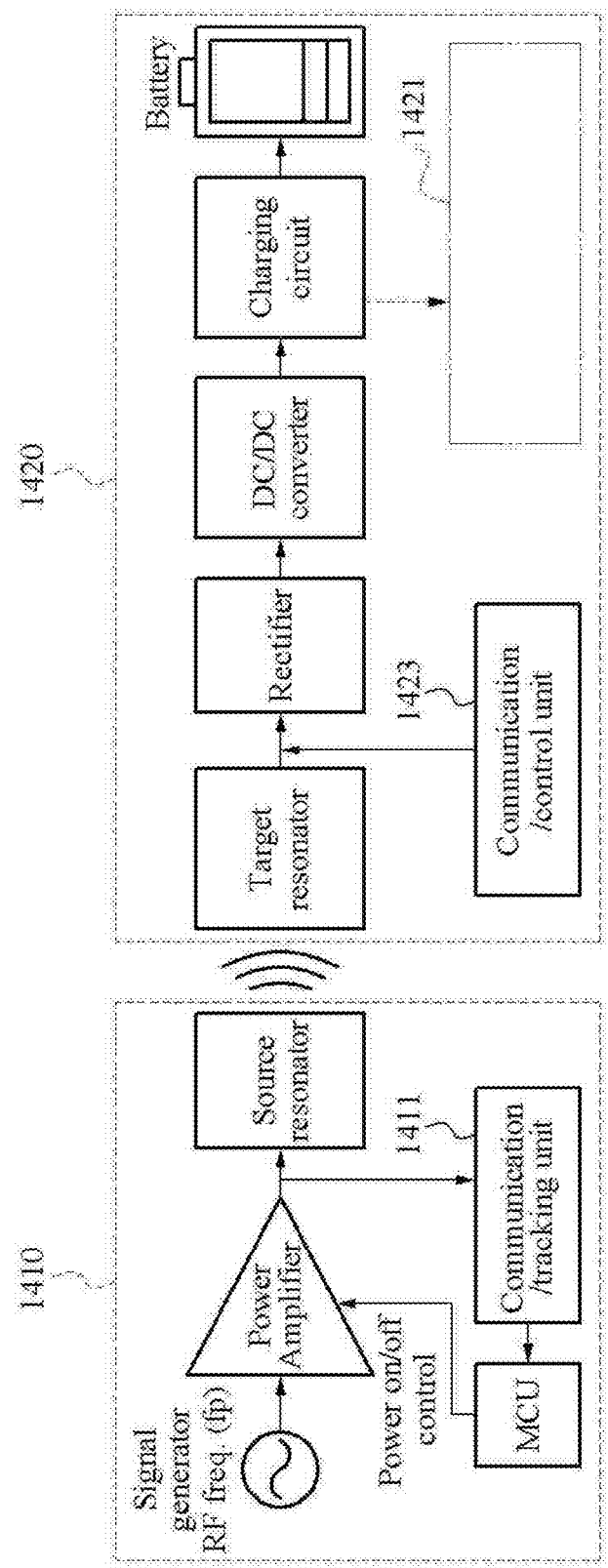
FIG. 14 is a diagram illustrating an example of a wireless power transmitter and a wireless power receiver.

FIG. 14 is a diagram illustrating an example of a wireless power transmitter and a wireless power receiver. Referring to FIG. 14, a wireless power transmitter 1410 may be mounted in each of the pad 1210 of FIG. 12A and pads 1230 and 1240 of FIG. 12B. Additionally, the wireless power transmitter 1410 may be mounted in each of the mobile terminal 1320 of FIG. 13A and the mobile terminal 1340 of FIG. 13B.

In addition, a wireless power receiver 1420 may be mounted in each of the mobile terminal 1220 of FIG. 12A and the hearing aids 1250 and 1260 of FIG. 12B. Further, the wireless power receiver 1420 may be mounted in each of the electronic device 1310 of FIG. 13A and the hearing aid 1330 of FIG. 13B.

The wireless power transmitter 1410 may include a similar configuration to the source device 110 of FIG. 1. For example, the wireless power transmitter 1410 may include a unit configured to transmit power using magnetic coupling.

Referring to FIG. 14, the wireless power transmitter 1410 includes a signal generator, a power amplifier, a microcontroller unit (MCU), a source resonator, and a communication/tracking unit 1411. The communication/tracking unit 1411 communicates with the wireless power receiver 1420, and controls an impedance and a resonance frequency to maintain a wireless power transmission efficiency. Additionally, the communication/tracking unit 1411 may perform similar functions to the power converter 118 and the control/communication unit 115 of FIG. 1.

The wireless power receiver 1420 may include a similar configuration to the target device 120 of FIG. 1. For example, the wireless power receiver 1420 may include a unit configured to wirelessly receive power and to charge a battery.

Referring to FIG. 14, the wireless power receiver 1420 includes a target resonator, a rectifier, a DC/DC converter, and a charging circuit. Additionally, the wireless power receiver 1420 includes a communication/control unit 1423. The communication/control unit 1423 communicates with the wireless power transmitter 1410, and performs an operation to protect overvoltage and overcurrent.

The wireless power receiver 1420 may include a hearing device circuit 1421. The hearing device circuit 1421 may be charged by a battery. The hearing device circuit 1421 may include a microphone, an analog-to-digital converter (ADC), a processor, a digital-to-analog converter (DAC), and a receiver. For example, the hearing device circuit 1421 may include the same configuration as a hearing aid.

According to the teachings above, there is provided a wireless power transmission system, which may increase a power transmission efficiency while reducing an interference in neighboring devices using an in-band communication scheme. Additionally, it is possible to exchange a variety of information between a source device and a target device of the wireless power transmission system through command messages and response messages. Furthermore, the source device performs power control based on an efficiency of a DC/DC converter in the target device.

The units described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing commands in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, a command, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing commands or data to or being interpreted by the processing device. The software also may be distributed over network coupled computer systems so that the software is stored and executed in a distributed fashion. The software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

As a non-exhaustive illustration only, a terminal and a device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling power in a wireless power transmission apparatus, the method comprising:
   transmitting a wake-up power to a target device, the wake-up power being used to activate a communication function and a control function of the target device;
   transmitting, by a source device, a request signal to the target device;
   receiving, from the target device, a response signal corresponding to the request signal, the response signal comprising a parameter of the target device;
   determining an amount of transmitted power of the source device based on a parameter of the source device and determining an amount of received power of the target device based on the parameter of the target device, wherein the transmitted power and the received power are associated with the wake-up power; and
   generating an operating power based on the determined amount of transmitted power and the determined amount of received power.

2. The method of claim 1, wherein the parameter of the target device comprises information regarding an input voltage and an output voltage of a rectifier of the target device, or an input current and an output current of the rectifier, or an input voltage and an output voltage of a direct current (DC)-to-DC (DC/DC) converter of the target device, or an input current and an output current of the DC/DC converter, or a voltage and a current of a battery of the target device, or any combination thereof.

3. The method of claim 1, wherein the generating comprises:

calculating a power transmission efficiency of the source device based on the parameter of the source device and the parameter of the target device, and determining an amount of the operating power based on the power transmission efficiency.

4. The method of claim 1, wherein the parameter of the source device comprises information regarding an input voltage and an input current of a power amplifier of the other device, or an output voltage and an output current of the power amplifier, or any combination thereof.

5. The method of claim 1, further comprising:
transmitting the operating power to the target device, using a magnetic coupling;
sending, to the target device, a request for the parameter of the target device;
re-receiving, from the target device, the parameter of the target device; and
changing an amount of the operating power based on the re-received parameter of the target device.

6. The method of claim 5, wherein the changing comprises:
calculating an efficiency of a DC/DC converter of the target device based on an input current and an output current of the DC/DC converter that is included in the re-received parameter of the target device; and
changing the amount of the operating power based on the efficiency of the DC/DC converter.

7. The method of claim 5, wherein the re-received parameter of the target device comprises information regarding an input voltage and an output voltage of a rectifier of the target device, or an input current and an output current of the rectifier, or an input voltage and an output voltage of the DC/DC converter of the target device, or an input current and an output current of the DC/DC converter, or a voltage and a current of a battery of the target device, or any combination thereof.

8. A method of receiving power in a wireless power transmission system, the method comprising:
receiving a wake-up power from a source device, the wake-up power being used to activate a communication function and a control function of a target device;
receiving a request signal from the source device;
transmitting, to the source device, a response signal corresponding to the request signal, the response signal comprising a parameter of target device; and
receiving an operating power, the operating power being generated based on an amount of transmitted power of the source device and an amount of received power of the target device,
wherein the amount of transmitted power of the source device is determined based on a parameter of the source device and the amount of received power of the target device is determined based on the parameter of the target device, and
wherein the transmitted power and the received power are associated with the wake-up power.

9. The method of claim 8, further comprising:
activating the communication function and a control function of the target device, using the wake-up power.

10. The method of claim 8, wherein the parameter of the target device comprises information regarding an input voltage and an output voltage of a rectifier of the target device, or an input current and an output current of the rectifier, or an input voltage and an output voltage of a direct current (DC)-to-DC (DC/DC) converter of the target device, or an input current and an output current of the DC/DC converter, or a voltage and a current of a battery of the target device, or any combination thereof.

11. The method of claim 8, further comprising:
receiving the operating power from the source device, using a magnetic coupling;
receiving, from the source device, a request for the parameter of the target device;
acquiring the parameter of the target device; and
re-transmitting, to the source device, the acquired parameter of the target device.

12. A source device of a wireless power transmission system, the device comprising:
a power converter configured to generate an operating power; and
a control/communication unit configured to
transmit a wake-up power to the target device, the wake-up power being used to activate a communication function and a control function of the target device,
transmit a request signal to the target device,
receive, from the other device, a response signal corresponding to the request signal, the response signal comprising a parameter of the target device,
determine an amount of transmitted power of the source device based on a parameter of the source device,
determine an amount of received power of the target device based on the parameter of the target device, and
control the power converter to generate the operating power based on the determined amount of transmitted power and the determined amount of received power,
wherein the transmitted power and the received power are associated with the wake-up power.

13. The device of claim 12, wherein the power converter is further configured to:
convert a direct current (DC) voltage to an alternating current (AC) voltage using a resonant frequency, to generate the wake-up power and the power, the wake up power.

14. The device of claim 12, further comprising:
a resonator configured to transmit, to the target device, a wake-up power and the operating power, using a magnetic coupling, the wake-up power being used to activate a communication function and a control function of the target device.

15. The device of claim 12, wherein the parameter of the target device comprises information regarding an input voltage and an output voltage of a rectifier of the target device, or an input current and an output current of the rectifier, or an input voltage and an output voltage of a DC-to-DC (DC/DC) converter of the target device, or an input current and an output current of the DC/DC converter, or a voltage and a current of a battery of the target device, or any combination thereof.

16. The device of claim 12, wherein:
the power converter is further configured to generate the wake-up power,
the control/communication unit is further configured to
calculate a power transmission efficiency of the device based on the parameter of the source device, and the parameter of the target device, and
determine an amount of the operating power based on the power transmission efficiency.

17. The device of claim 12, further comprising:
a power amplifier, wherein the parameter of the source device comprises information regarding an input voltage and an input current of the power amplifier, or an output voltage and an output current of the power amplifier, or any combination thereof.

18. A target device of a wireless power transmission system, the device comprising:
- a control/communication unit configured to
  - receive a wake-up power from a source device, the wake-up power being used to activate a communication function and a control function of a target device,
  - receive a request signal from a source device, and
  - transmit, to the source device, a response signal corresponding to the request signal, the response signal comprising a parameter of the target device; and
- a resonator configured to receive an operating power,
- wherein the operating power is generated based on an amount of transmitted power of the source device and an amount of received power of the target device,
- wherein the amount of transmitted power is determined based on a parameter of the source device and the amount of received power is determined based on the parameter of the target device, and
- wherein the transmitted operating power and the received power are associated with the wake-up power.

19. The device of claim 18, wherein:
- the resonator is further configured to receive, from the source device, the wake-up power and the operating power, using a magnetic coupling; and
- the control/communication unit is further configured to activate a communication function and a control function of the target device, using the wake-up power.

20. The device of claim 18, further comprising:
- a rectifier;
- a direct current (DC)-to-DC (DC/DC) converter; and
- a battery,
- wherein the parameter of the target device comprises information regarding an input voltage and an output voltage of the rectifier, or an input current and an output current of the rectifier, or an input voltage and an output voltage of the DC/DC converter, or an input current and an output current of the DC/DC converter, or a voltage and a current of the battery, or any combination thereof.

* * * * *